June 13, 1939.  P. H. SCOTT  2,162,446
COVER MOUNTING AND LOCKING MEANS FOR THE TANKS OF TANK TRUCKS
Filed March 12, 1937
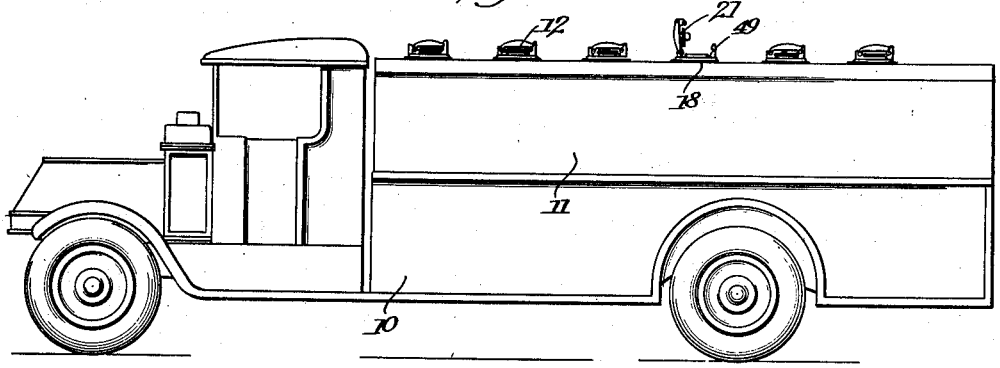
Fig. 1.
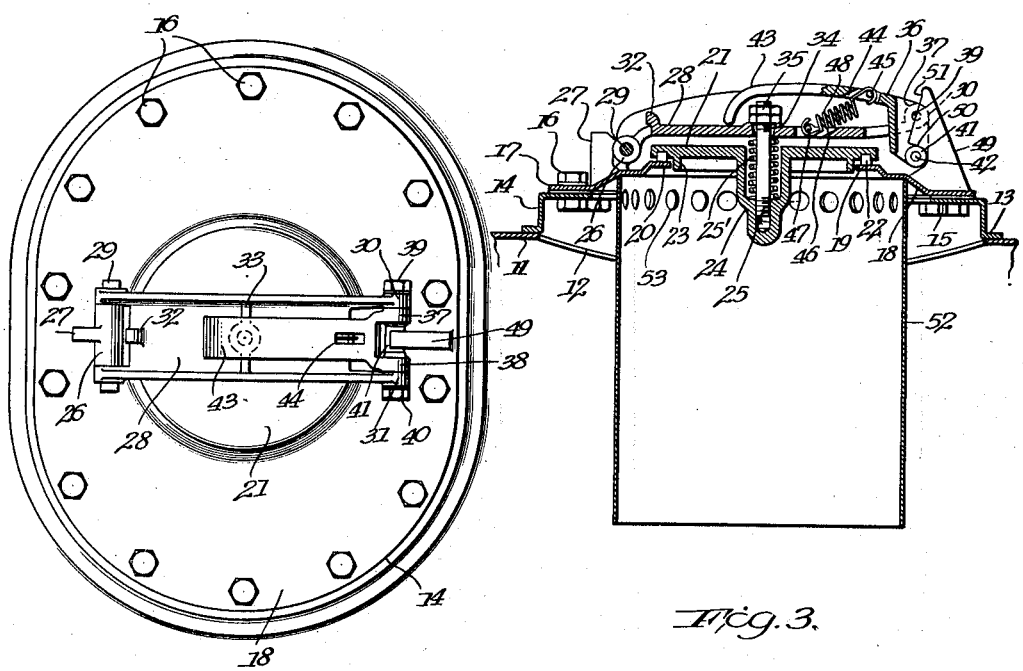
Fig. 2.
Fig. 3.
Inventor
Paul H. Scott.
By Cushman Darby & Cushman
Attorneys Patented June 13, 1939

2,162,446

UNITED STATES PATENT OFFICE 2,162,446

COVER MOUNTING AND LOCKING MEANS FOR THE TANKS OF TANK TRUCKS

Paul H. Scott, Long Island City, N. Y., assignor to The William F. Kenny Company, New York, N. Y., a corporation of New York Application March 12, 1937, Serial No. 130,591

6 Claims. (Cl. 220—57)

The present invention relates to mounting and locking means for the covers of the tanks of tank trucks, and has as a principal purpose to provide such means of compact and efficient form with the locking means thereof sure in operation whether the covers be swung to closed position by a manually controlled movement or freely swung to closed position as a result, for example, of accidental travelling movements of the truck when the covers are open. By way of illustration of the invention, I have shown a practical embodiment thereof in the accompanying drawing, in which:

Figure 1 is a side elevation of a tank truck equipped with the cover mounting and locking means of the present invention.

Figure 2 is an enlarged plan view of one of the mounting and locking means, and

Figure 3 is a central longitudinal section of the same.

Referring to the drawing, reference numeral 10 designates generally a wheeled chassis of any preferred type, upon which is mounted a tank 11. The tank is here conceived of as being divided into six compartments, each having a top opening provided with a cover 21. In Figure 1 the third cover from the rear end of the tank is shown as being in open position, the remainder of the covers being closed.

To refer particularly to Figures 2 and 3, above each compartment the tank shell is provided with an opening 12 to whose upper margins, as here shown, is welded the conforming flange 13 of an adapter 14, the adapter having a top inwardly turned flange 15 lying in a horizontal plane. To the flange 15 is secured, by means of bolts 16, the outer marginal portion 17 of a domed plate 18 which is provided centrally with a circular opening 19, the opening being surrounded by an upwardly offset flange 20 which lies in a horizontal plane.

A circular cover 21 has a groove on its underside and adjacent its outer edge in which is disposed an annular gasket 22 adapted to seat against the top of flange 20. Inwardly of flange 20 the cover has an annular centering and reinforcing rib 23.

Centrally of the cover 21 is a downwardly projecting hollow boss 24 into the bottom wall of which is threaded the lower end of a pin 25 whose upper end projects substantially above the top of the cover.

At the forward side of the opening 19 a pintle block 26 is welded to the plate 18, this block being provided with a horizontal bore extending transversely of the truck. The block 26 is provided centrally and on its forward side with an abutment lug 27 whose purpose will later be described.

An arm 28 has at one end a pair of knuckles overlying the ends of block 26 and apertured in alignment with the bore of the latter to receive a pintle pin 29. The arm, as here shown, is in the form of a channel whose vertical webs terminate at one end in the knuckles just mentioned, and at the other end in a pair of knuckles 30 and 31 which are provided with aligned threaded apertures. The connecting web portion of the channel terminates short of block 26 and is provided with a lug 32 for cooperation with lug 27. This web at its other end terminates considerably short of knuckles 30 and 31 and centrally is provided on top with a transverse rib 33 which is enlarged centrally and provided with a downwardly tapering aperture 34 in which the upper end of pin 25 is received. A compression spring 25' is interposed between arm 28 and boss 24 in surrounding relation to pin 25. The spring seats at its lower end against the bottom of the boss cavity and at its upper end against the arm so that the arm and cover are yieldingly forced apart, the action of the spring being limited by lock nuts 35 threaded on the upper end of pin 25.

Mounted between knuckles 30 and 31 is a lever 36, the lever being split to provide knuckle portions 37 and 38 having plain bores in which are engaged the smooth ends of trunnion screws 39 and 40 which are threaded into the knuckles 30 and 31. Knuckle portions 37 and 38 are extended downwardly to provide a carrier portion comprising a pair of spaced webs between the lower ends of which is mounted a roller 41 on a pin 42 which extends between the two webs. Lever 36 also comprises a handle portion 43 which extends along arm 28 towards the pivoted end of the arm and between its side webs or flanges, the extremity of the handle portion being turned down as shown in Figure 3. Adjacent the pivoted end of lever 36 the handle portion is provided with a longitudinally extending slot 44 across which extends a pin 45. The central web of arm 28 is provided, somewhat forwardly of slot 44, with a longitudinally extending slot 46 across which extends a pin 47. Pins 45 and 47 are engaged by the hooked ends of a tension spring 48.

Welded to plate 18 at the rear side of opening 19 is a catch member 49 which has a forwardly faced retaining shoulder 50 surmounted by a rearwardly inclined cam surface 51, the catch member being positioned for cooperation with the engaging means constituted by the roller 41.

With the parts shown in the position of Figure 3, roller 41 is engaged under shoulder 50 and holds arm 28 securely in the horizontal position indicated wherein it extends across opening 19 with the cover gasket 22 seated on flange 20. Spring 25' is compressed so that the seating of the cover is secure and the loose fit of pin 25 in aperture 34 enables the cover to accommodate itself to existing conditions so that a tight closure is assured. Roller 41 is held under shoulder 50 not only by the action of spring 48 but also as a result of the weight of handle portion 43.

If the tank is to be opened, handle portion 43 is pulled upwardly against the action of spring 48 to release roller 41 from shoulder 50. Hereupon arm 28, together with the cover, may be swung to the upright position indicated in Figure 1 wherein lug 32 rests on lug 27 with the arm and cover in a slightly forwardly overbalanced position relative to the hinging axis of the arm. When handle 43 is released the action of spring 48 is limited by the abutment of the handle extremity with the central web of arm 28.

The balance of arm 28 and cover 21, as determined by the abutment lugs, is sufficiently delicate so that a very slight shock will cause the arm and cover to swing downwardly, roller 41 eventually striking the surface 51 and riding therealong until it is enabled to move under shoulder 50. The weight of arm 28, together with lever 36, is such that the arm may have continued movement, due to its momentum, against the action of spring 25' after the cover has seated, thus enabling the roller 41 to move securely under the shoulder.

If spring 48 were to be broken, movement of lever 36 about its pivotal axis would be limited through abutment of its depending portion with the adjacent edge of the central web of arm 28 and the weight of handle portion 43 would still cause roller 41 to move under shoulder 50. Roller 41, it will be noted, is positioned almost directly below the pivoting axis of lever 36 so as to withstand to the best advantage the reaction of spring 25'. This relation is securable due to the clearance provided above the roller.

If desired, a cylindrical baffle 52 may be suspended beneath plate 18, this baffle being provided around its upper end with apertures 53.

Since various changes may be made in the form and arrangement of the parts of the illustrative embodiment herein disclosed, I do not limit myself in these respects except as in the following claims.

I claim:

1. In a tank truck, a tank having a top opening, an arm pivoted at one side of said opening on a horizontal axis and being swingable between an upright position and a position in which it extends substantially horizontally across said opening, a cover for said opening carried by said arm, an upright catch member fixed at the opposite side of said opening from the pivoting axis of said arm, a lever pivoted to the free end of said arm on an axis parallel to said pivoting axis, said lever having at one end a handle portion extending along said arm toward the pivoted end of the latter and at the other end means for engaging said catch member to hold the arm in horizontal position with the cover in closing relation to said opening, said catch member having a retaining shoulder for said engaging means and a cam surface surmounting said shoulder, said lever being manually swingable away from said arm to engage or release said engaging means or said lever being automatically swingable as said engaging means rides over said cam surface and beneath said shoulder when said cover falls to closed position in the absence of manual operation.

2. In a tank truck, a tank having a top opening, an arm pivoted at one side of said opening on a horizontal axis and being swingable between an upright position and a position in which it extends substantially horizontally across said opening, a cover for said opening carried by said arm, an upright catch member fixed at the opposite side of said opening from the pivoting axis of said arm, a lever pivoted to the free end of said arm on an axis parallel to said pivoting axis, said lever having at one end a handle portion extending along said arm toward the pivoted end of the latter and at the other end means for engaging said catch member to hold the arm in horizontal position with the cover in closing relation to said opening, said engaging means being below the pivot of said lever when the arm is in horizontal position, said catch member having a retaining shoulder for said engaging means and a cam surface surmounting said shoulder, said lever being manually swingable away from said arm to engage or release said engaging means or said lever being automatically swingable as said engaging means rides over said cam surface and beneath said shoulder when said cover falls to closed position in the absence of manual operation.

3. In a tank truck, a tank having a top opening, an arm pivoted at one side of said opening on a horizontal axis and being swingable between an upright position and a position in which it extends substantially horizontally across said opening, a cover for said opening carried by said arm, an upright catch member fixed at the opposite side of said opening from the pivoting axis of said arm, a lever pivoted to the free end of said arm on an axis parallel to said pivoting axis, said lever having at one end a handle portion extending along said arm toward the pivoted end of the latter and at the other end means for engaging said catch member to hold the arm in horizontal position with the cover in closing relation to said opening, said catch member having a retaining shoulder for said engaging means and a cam surface surmounting said shoulder, said lever being manually swingable away from said arm to engage or release said engaging means or said lever being automatically swingable as said engaging means rides over said cam surface and beneath said shoulder when said cover falls to closed position in the absence of manual operation, and a tension spring connecting said arm and the handle portion of said lever.

4. In a tank truck, a tank having a top opening, an arm pivoted at the forward side of said opening on a horizontal axis extending transversely of the truck, a cover for said opening, a connection between said arm and cover through which the latter is carried by the former, said connection including compressible means to enable the arm and cover to be mutually approached from a normal relation, said arm being swingable between a substantially horizontal position wherein said cover closes said opening and an upright slightly forwardly overbalanced position in which it is adapted to stand but from which it is adapted to be readily displaced toward closing position as a result of vibration caused by accidental travelling movement of the truck, an upright catch member fixed at the opposite side of said opening from the pivoting axis of said arm, said catch member comprising a retaining shoulder surmounted by a cam surface, and a spring-urged engaging means carried by the free end of said arm for cooperation with said catch member, the arrangement as a whole and the weight of said arm being such that when said arm is freely swung from upright position it has a continued movement after the cover has reached closing position whereby said engaging means is enabled to be securely seated under the shoulder of said catch means, such continued movement being permitted by said compressible means and the latter thereupon expanding to insure tight seating of said cover.

5. Structure according to claim 4 wherein said engaging means is at one end of a carrier which is pivoted to said arm on an axis vertically spaced from said engaging means when the arm is in horizontal position.

6. In a tank truck, a tank having a top opening, an arm pivoted at one side of said opening on a horizontal axis and being swingable between an upright position and a position in which it extends substantially horizontally across said opening, a cover for said opening carried by said arm, an upright catch member fixed at the opposite side of said opening from the pivoting axis of said arm, a lever pivoted to the free end of said arm on an axis parallel to said pivoting axis, said lever having at one end a handle portion extending along said arm toward the pivoted end of the latter and having an angular portion projecting past the free end of said arm, said angular portion comprising transversely spaced webs, a roller mounted between the free ends of said webs, said roller being positioned below the pivoting axis of said lever when said arm is in horizontal position, said roller being engageable by said catch member to hold the arm in horizontal position with the cover in closing relation to said opening, said catch member having a retaining shoulder for said roller and a cam surface surmounting said shoulder, said lever being manually swingable away from said arm to engage or release said roller or said lever being automatically swingable as said roller rides over said cam surface and beneath said shoulder when said cover falls to closed position in the absence of manual operation.

PAUL H. SCOTT.